Patented July 28, 1942

UNITED STATES PATENT OFFICE 2,291,334

PROCESS OF SUSTAINED TOXICITY INDUCTION

Jacquelin E. Harvey, Jr., Atlanta, Ga., assignor of one-half to Southern Wood Preserving Company, East Point, Ga., a corporation of Georgia No Drawing. Application August 14, 1940, Serial No. 352,658

1 Claim. (Cl. 196—53)

The present invention relates to enhanced induction of useful characteristics in hydrocarbon materials.

More specifically the present invention relates to the enhanced induction of toxic properties in tars of aromatic content and fractions thereof.

An object of the present invention is the enhancement of toxic increment in tars of aromatic content and fractions thereof, including wood preserving oils.

A further object of the present invention is the subjection of starting materials to the controlled action of hydrogen and hydrogen sulfide, while contacting a sulfide catalyst, said hydrogen sulfide representing a partial pressure of at least a fractional atmosphere, whereby to enhance toxicity induction.

Still another object of the present invention is the maintenance of toxicity inducing conditions without substantial reduction.

Other objects of the present invention will become apparent from the following disclosures.

It has previously been discovered that tars of aromatic content and fractions thereof, including wood preserving oils, could have toxic properties induced therein by subjecting said material to the controlled action of hydrogen.

It is now discovered that said toxicity induction can be enhanced by maintaining a hydrogen sulfide atmosphere when catalyzing the reaction with a sulfide catalyst. Unless such provision is made the sulfide catalyst is converted, at least to a degree, to a form other than the sulfide, as for instance, to the oxide or metal or the like. Such change finally results in a lowered toxicity synthesis.

Thus the present invention provides for the maintenance of a hydrogen sulfide atmosphere necessary to maintain at least a portion of said sulfide catalyst in substantial sulfide form. As a general rule, a hydrogen sulfide partial pressure of in the order of one atmosphere will suffice to maintain at least a portion of the sulfide catalyst in substantial sulfide form, however, at times only a fractional atmosphere is necessary, while at other times it may be desirable to maintain a hydrogen sulfide atmosphere in excess of one atmosphere.

Some of the starting materials may be of sufficient sulphur content or have sulphur bearing material contained therein to generate, under conditions of the process, sufficient hydrogen sulfide for the indicated purpose. Other starting materials may have a deficiency of sulphur or sulphur bearing material for subsequent conversion or generation to hydrogen sulfide. A few trials with any starting material will quickly determine the amount of sulphur or sulphur bearing material necessary for the stated purpose to the end that toxicity induction be maintained without substantial reduction, neglecting the normal aging of the catalyst involved.

The following examples will serve to illustrate modes of practicing the present invention.

*Example 1.*—A wood preserving creosote complying with A. W. P. A. specifications, having coke residue of 2% and having known toxic value is passed through a high pressure reaction vessel at 400° C. and 225 atmospheres pressure; flow of hydrogen and hydrogen sulfide 14,000 cubic feet per barrel creosote; hydrogen sulfide partial pressure one and one half atmospheres; time of contact 45 minutes; catalyst molybdenum sulfide.

The beneficiated creosote flowing from the high pressure reactor will be found to have a toxic value in excess of its parent material. Temperature and pressure and gas flow are so coordinated as to induce no percentage of non-toxic constituents, as for instance liquid chain structures, that would preclude aforesaid toxic induction. A few trials with any of the starting materials will enable those skilled in the art to arrive at the necessary coordination.

The starting materials of the present process are tars of aromatic content and fractions thereof, including wood preserving oils, capable of having toxicity induced therein in accordance with the present process. Tars of aromatic content derived from wood, coal, petroleum, gas and gases, are suitable starting materials. Such tars and fractions thereof are provided with enhanced toxicity induction by the process of the present invention.

*Example 2.*—A coal tar fraction whose initial boiling point is substantially 220° C. and boils substantially 50% above 355° C. with a coke residue in excess of 5% is subjected to the action of hydrogen and hydrogen sulfide while contacting a cobalt sulfide catalyst at a temperature of 405° C. and 350 atmospheres pressure. The hydrogen sulfide partial pressure is one atmosphere. The period of treatment is substantially one hour. The beneficiated tar fraction will be found to have a toxicity in excess of its parent material, which toxicity, among other things, flows from maintaining toxicity inducing conditions without substantial reduction other than the normal aging of the catalyst.

The induced toxicity also flows from the reduction at least to a degree of molecular complexes contained in the starting material while subjected to the process controls.

*Example 3.*—A coal tar, specific gravity 1.1641 and a coke residue in excess of 6% is subjected to the action of hydrogen at 390° C. for one hour. The total pressure is 350 atmospheres and the hydrogen sulfide partial pressure is one and one-half atmospheres; the catalyst, tungsten sulfide and iodoform. The process will be found to provide enhanced toxic induction in the starting material.

*Example 4.*—A pitch derived from a tar of aromatic content is subjected to the action of hydrogen and hydrogen sulfide while contacting a molybdenum sulfide catalyst and a total pressure of 500 atmospheres; the hydrogen sulfide partial pressure being maintained at one atmosphere. Time of reaction is two hours. The beneficiated pitch will be found to have a toxicity in excess of its starting material.

The beneficiated starting materials aforenamed will be found to be useful, as such, in the wood preserving industry, or useful in said industry as a component part of toxic oils, that is to say, useful for addition to other toxic oils.

The term "pitch" as used herein includes the higher boiling fractions of tars, in other words tars from which low boiling ends have been stripped, such low boiling ends being suitable for use per se as creosote, other wood preservative or solvent. For instance, the final residue resulting from evaporating tar to dryness and then stripping wood preservative from the distillate is a very suitable pitch for use as a starting material of the present process.

Starting materials at least once refined by the action of hydrogen or in other manner provide suitable materials for the enhanced induction of toxicity in accordance with the present process.

By the term beneficiated as used herein and in the appended claims is meant the starting material at least once subjected to the action of hydrogen and hydrogen sulfide in the presence of the sulfide catalysts in accordance with the present process.

When flowing the starting material to a reactor, the hydrogen and hydrogen sulfide supply is, on one hand, preferably maintained at least slightly in excess of that flow which would produce carbonaceous increment due to insufficient gas flow, and on the other hand, at least slightly below that flow which through stripping action would also induce carbonaceous increment that would be highly susceptible to thermal degradation, as for instance coking. As a general instruction it may be said that gas flow of in the order of 12,000 cubic feet per barrel feed stock is satisfactory, however, lower and higher gas flows are usable.

Pressures generally in excess of 50 atmospheres are usable, however, pressures in the order of 200 atmospheres, or above are preferred. Temperatures of 200° C. or lower are usable, however, temperatures of in the order of above 300° C. are preferred. A few trials with any of the starting materials will show the higher limits of temperature that may be maintained without subjecting the starting material to thermal degradation, as for instance inordinate coking.

Among other things the present invention is predicated on subjecting a mixture of tar fractions of aromatic content to the action of hydrogen and hydrogen sulfide while contacting a sulfide catalyst to the end that toxicity induction be maintained without substantial reduction other than the inherent reduction as flowing from the aging of the catalyst. The time, temperature, pressure and gas flow are so coordinated as to induce no substantial percentage of non-toxic liquid hydrocarbons, as for instance chain structures, that would preclude aforesaid enhanced toxicity induction.

All catalysts effective in the presence of hydrogen are usable in conjunction with aforesaid sulfide catalyst, as for instance, chromium, molybdenum, vanadium, uranium, cobalt, copper and their compounds, for instance sulfides or oxides, promoted or not; with or without small amounts of alkali, acid or halid, or derivatives thereof. Small amounts of halogen or halogens, as such, or incorporated with other substances may be used or effective catalysts deposited on carriers, as for instance gels, earths, carbon, or the like. The catalyst may be in various shapes, as for instance forms, extruded shapes or lengths, pellets, comminuted; mixed with other material possessing desired action or not; with or without other material effecting splitting or not; catalysts with added halogen derivatives.

The gas flow or gas action of the present process is further characterized by a beneficiation in the starting material that reflects itself in lowered coke residue, specific gravity and viscosity.

The time element cannot be spoken of as an arbitrary figure, inasmuch as the starting materials are of varied nature. On some feed stocks an hour period will suffice to show the enhanced toxic induction of the present process, whereas on other feed stocks a fractional part of an hour will suffice to show the enhanced toxic induction. Longer periods are usable.

Hydrogen or hydrogen containing gas from whatever source derived may be used; material or materials capable of generating hydrogen, or releasing hydrogen may be used.

Starting materials include tars and fractions thereof derived from wood, coal, and petroleum including gases of carbon content; as for instance wood tar, pine tar, coke oven tar, gas house tar, water gas tar and synthetic aromatic tars derived from petroleum sources including gases containing carbon.

Starting materials previously subjected to the action of hydrogen are suitable starting materials.

Starting materials of the present process also include tars of aromatic content from which low boiling fractions have been removed, as for instance tars from which solvent oils have been removed. Viewed broadly, the starting materials of the present process are tars of aromatic content, fractions of said tar of lower boiling point and less viscous than the parent tar, and of higher boiling point and more viscous than the said tars, the latter due to removal of low boiling fractions from the tars; high boiling fractions and pitches.

A convenient method for evaluating toxic value is described on page 2, under the caption "Method of conducting the tests," Technical Bulletin No. 346, March, 1933, U. S. Dept of Agriculture.

Minor changes may be made in the physical embodiment of the invention within the scope of the appended claim without departing from the spirit of the invention.

I claim:

In the rendering of a mixture of high temperature coal tar fractions more toxic to wood destroying agencies, the process which comprises: subjecting said material to the action of a flow of hydrogen and hydrogen sulfide whilst catalyzing the reaction with a metallic sulfide catalyst and iodoform at a temperature and pressure in excess of 200° C. and 50 atmospheres, respectively; carrying on the process for a period not in excess of about two hours whereby to provide a material of induced toxic properties and lowered coke residue, specific gravity and viscosity.

JACQUELIN E. HARVEY, Jr.